United States Patent Office 3,088,833
Patented May 7, 1963

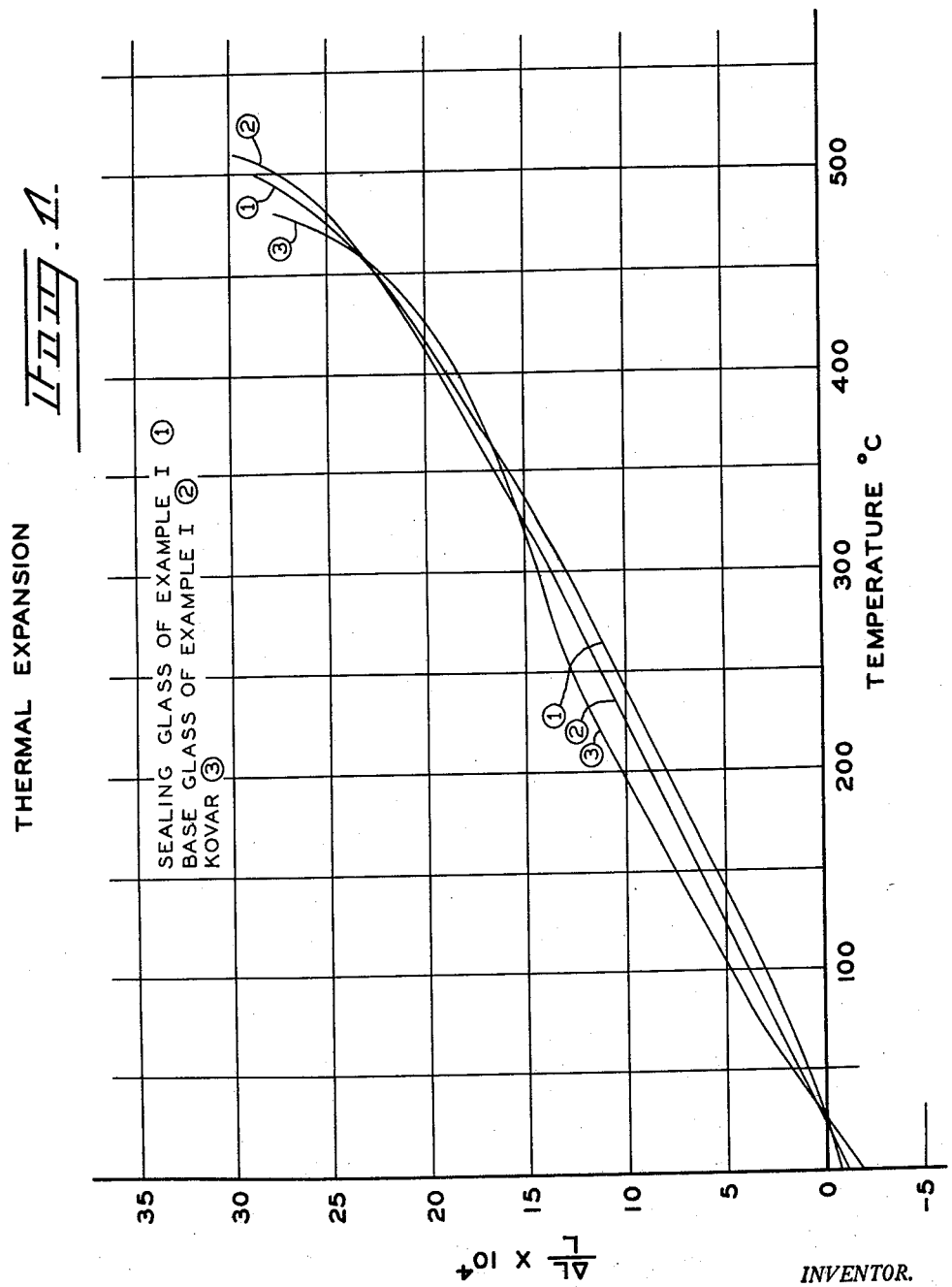

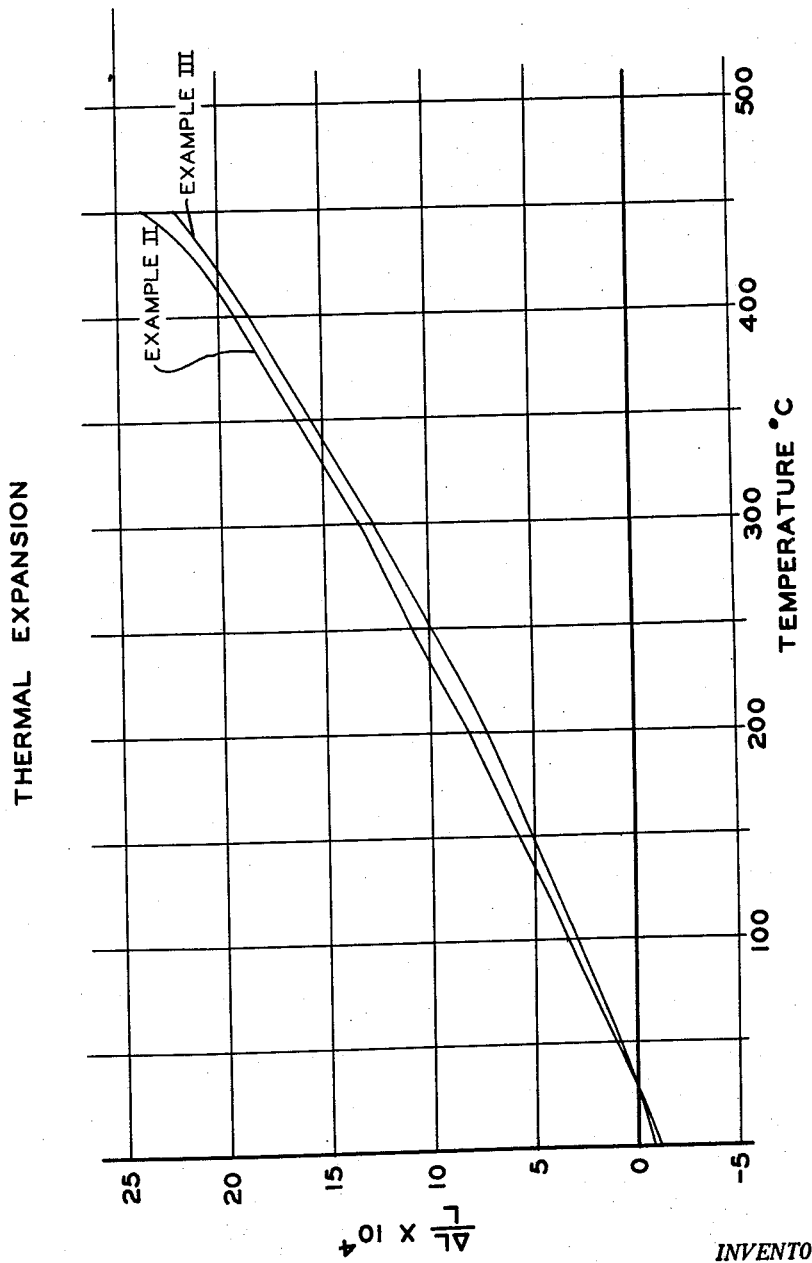

3,088,833
SEALING GLASS
Perry P. Pirooz, Toledo, Ohio, assignor to Owens-Illinois Glass Company, a corporation of Ohio
Filed June 6, 1960, Ser. No. 34,223
6 Claims. (Cl. 106—53)

This invention relates to sealing glasses. In a particular aspect the invention relates to low expansion sealing glasses having good fluidity at relatively low temperatures.

A need exists for sealing glasses for sealing relatively low expansion glass parts to each other or for sealing relatively low expansion glasses to metals of comparable expansion characteristics. Coupled with the requirement for a relatively low expansion sealing glass, it is desirable that such sealing glasses have fairly low annealing points and be quite fluid at relatively low temperatures so that the hot dip method of application of sealing glass can be employed without heating the parent material being sealed above its annealing point, after the seal is formed during the annealing step of the process.

Accordingly, it is an object of this invention to provide sealing glass compositions having relatively low expansion coefficients, which glasses are suitable for hot dip application at temperatures in the range from about 2000° F. to 1800° F. or lower.

Other objects, as well as aspects and advantages, of the invention, will become apparent from a consideration of the accompanying disclosure and the drawings.

According to the invention, there are provided glass compositions containing from 11 to 29 weight percent PbO, from 18 to 32 percent $B_2O_3$, from 34 to 46 percent ZnO, from 7 to 14 percent $SiO_2$, and from 8 to 16 percent CuO.

The foregoing glass compositions of the invention have fiber softening points of less than 600° C. Glasses consisting essentially of the foregoing components in the foregoing proportions generally have expansion coefficients over the range from 0 to 425° C. of from $45 \times 10^{-7}$ to $65 \times 10^{-7}$. They are useful for sealing together glass parts having comparable expansion coefficients.

In a particular and important embodiment of the invention there are provided glass compositions having annealing points not over about 485° C., thermal expansion coefficients (0 to 425° C.) within the range from $49 \times 10^{-7}$ to $53 \times 10^{-7}$, and having 14 to 20 weight percent PbO, 19 to 21 weight percent $B_2O_3$, 38 to 42 weight percent ZnO, 10 to 14 weight percent $SiO_2$, and 9 to 13 weight percent CuO. If desired, the glass compositions can contain up to 5 percent of other compatible glass-making oxides, such as up to 5 weight percent CdO or $Bi_2O_3$, or up to 1 weight percent $Sb_2O_3$, $As_2O_3$, or colorants such as CoO.

The latter more narrowly defined glasses set forth in the preceding paragraph as having expansion coefficients from $49-53 \times 10^{-7}$ find particular application in the sealing of Kovar metal parts or Kovar parts to glass parts. As is well known, Kovar is an alloy having the approximate composition, as follows:

| | Weight percent |
|---|---|
| Iron | 54 |
| Nickel | 29 |
| Cobalt | 17 |

Actually, Kovar also contains about 0.5% or less of impurities, mainly manganese, silicon and a very small amount of carbon.

FIGURE 1 shows the expansion curves of the sealing glass of Example I, of a base glass of Example I, and of Kovar metal, while FIGURE 2 shows the expansion curves of sealing glasses of Examples II and III.

As will be seen from FIGURE 1, the expansion curve of Kovar is somewhat difficult to match since it is irregular in contrast to the smooth expansion curve of most glasses. The foregoing glasses, however, very closely match the Kovar metal and have great fluidity at comparatively low temperatures.

The great fluidity at relatively low temperatures exhibited by the sealing glass compositions of this invention is due in large part to the presence of the copper oxide. The copper oxide is very important in the compositions because it gives this fluidity without increasing the expansion of glasses having the other components of the invention in the ranges indicated to any significant extent. While silica would contribute more to a lowering of expansion of such glasses, increasing amounts of silica greatly increase the viscosity of the melted glasses and this is disadvantageous, particularly in hot dip applications, as previously explained.

The sealing glasses of the present invention are prepared by normal glass-forming procedures. Glass-making components in powder form are mixed and are melted together in the conventional manner in a platinum crucible in a furnace, usually at a temperature in the range of from about 2000° F. to 2300° F. in order to obtain homogeneous, vitreous glass compositions.

The following examples of representative compositions of the invention are merely illustrative and are not to be considered as limiting the invention.

*Example I*

The following components were melted together in the following proportions to prepare the glass:

| | Parts by weight |
|---|---|
| Lead silicate (85% PbO, 15% $SiO_2$) | 60 |
| Flint sand (99.9% $SiO_2$) | 30 |
| Boric acid (98% $B_2O_3$, 2% $H_2O$) | 61.2 |
| Zinc oxide | 120 |
| Cupric oxide | 30 |

The temperature of melting was about 2100° F. From the above charge, it will be seen that the composition of the resulting glass was as follows:

| | Parts by weight |
|---|---|
| Lead oxide (PbO) | 17 |
| Boron oxide ($B_2O_3$) | 20 |
| Zinc oxide | 40 |
| Silicon dioxide | 13 |
| Copper oxide (CuO) | 10 |

This glass had an annealing point of 476° C. and a fiber softening point of 571° C. Its coefficient of expansion over the range from 0 to 425° C. was about $50.2 \times 10^{-7}$, while the coefficient of expansion of Kovar over the same range is about $51.3 \times 10^{-7}$.

This sealing glass was employed to seal Kovar metal to a base borosilicate glass having an annealing point of 506° C., a fiber softening point of 710° C., and a coefficient of expansion (0–425° C.) of $51.2 \times 10^{-7}$.

The Kovar and the borosilicate glass were preheated to about 518° C. and the sealing glass was melted in a platinum crucible using gas-oxygen cross-fire burners. The sealing glass was heated to about 1800–2000° F. in this manner, and the Kovar and borosilicate glass parts to be sealed were dipped in the molten sealing glass and placed in sealing relationship until the sealing glass solidified on partial cooling, completing the seal. The sealed assembly was then annealed in a furnace maintained at about 518° C., for a period of about 15 minutes, to relieve stresses. Thereafter the assembly was slowly cooled to room temperature. A strong seal with little stress resulted.

If the annealing point of the sealing glass were significantly above the annealing point of the base glass, annealing of the sealed parts would have resulted in distortion of the base glass part, as will be understood.

The expansion curves of the solder glass of this example and of the base glass and the Kovar are shown in FIG. 1.

*Examples II and III*

The following compositions were prepared in a manner similar to that described in Example I.

|  | Parts by weight | |
|---|---|---|
|  | II | III |
| Lead oxide (PbO) | 20 | 14 |
| Boron oxide ($B_2O_3$) | 20 | 20 |
| Zinc oxide | 40 | 40 |
| Silicon dioxide | 10 | 13 |
| Copper oxide (CuO) | 10 | 13 |

The fiber softening points of these glasses are well below 600° C. In Example II the glass had an annealing point of 459° C. and in Example III the glass had an annealing point of 470° C. In FIGURE 2 the expansion curves of these glasses are plotted to the same scale as in FIGURE 1. Inspection will show that these glasses also very closely match the expansion of Kovar metal. The expansion for glass II in the range of from 0 to 425° C. was $52.9 \times 10^{-7}$ and the expansion coefficient for the glass of Example III was $49.7 \times 10^{-7}$. These glasses are also excellent for sealing to Kovar.

Hot dip seals were made with each of these solder glasses to a borosilicate glass by the hot dip method in a manner similar to that described in Example I, and the room temperature stress in the base glass was measured. This borosilicate base glass had an annealing point of 557° C., a fiber softening point of 754° C. and a coefficient of expansion (0–425° C.) of $60.4 \times 10^{-7}$. The stress obtained with sealing glass II was about 300 p.s.i. tension in the borosilicate glass and with sealing glass III was about 1150 p.s.i. tension in the borosilicate glass.

*Examples IV–XVI*

In the table below are shown compositions IV to XVI of the invention which have fiber softening points below 600° C. and coefficients of expansion (0–425° C.) in the range from $46.6 \times 10^{-7}$ (Example XVI) to $62.8 \times 10^{-7}$ (Example IV). These glasses were all prepared in a manner similar to that described in Example I. The table shows the compositions in parts by weight.

Hot dip seals were made to the same borosilicate glass set forth in Examples II and III. The measured stress in the borosilicate glass is shown in the table for the seals so prepared. Of course, the borosilicate glass employed was not ideally matched to the sealing glass. Nevertheless, good seals were effected even though the stress was somewhat undesirably high in some cases.

For comparative purposes it is noted that a hot dip seal was also made between the base glass of Example I and the sealing glass of Example I, and the stress in the base glass was about 400 p.s.i. compression. Another hot dip seal was made between the sealing glass of Example I and the borosilicate glass described in Examples II and III, and the measured stress in this seal was 1100 p.s.i. tension in the borosilicate glass.

As will be evident to those skilled in the art, various modifications of this invention can be made or followed in the light of the foregoing disclosure and discussion without departing from the spirit and scope of the disclosure or from the scope of the claims.

I claim:

1. A sealing glass composition having a fiber softening point below 600° C., a coefficient of expansion (0–425° C.) in the range from $45 \times 10^{-7}$ to $65 \times 10^{-7}$, and consisting essentially of 11 to 29 weight percent PbO, 18 to 32 weight percent $B_2O_3$, 34 to 46 weight percent ZnO, 7 to 14 weight percent $SiO_2$, and 8 to 16 weight percent CuO.

2. A sealing glass composition having an annealing point not over 485° C. and a thermal expansion coefficient (0–425° C.) in the range from $49 \times 10^{-7}$ to $53 \times 10^{-7}$, said glass consisting essentially of 14 to 20 weight percent PbO, 19 to 21 weight percent $B_2O_3$, 38 to 42 weight percent ZnO, 10 to 14 weight percent $SiO_2$, 9 to 13 weight percent CuO, said glasses having from 0 to not more than 5 weight percent of other compatible glass-making oxides.

3. A sealing glass composition having a fiber softening point below 600° C., a coefficient of expansion (0–425° C.) in the range from $45 \times 10^{-7}$ to $65 \times 10^{-7}$, and consisting essentially of 11 to 29 weight percent PbO, 18 to 32 weight percent $B_2O_3$, 34 to 46 weight percent ZnO, 7 to 14 weight percent $SiO_2$, 8 to 16 weight percent CuO, and up to 5 weight percent of other compatible glass-making oxides.

4. A sealing glass composition according to claim 1 and consisting essentially of about 17 parts by weight PbO, about 20 parts by weight $B_2O_3$, about 40 parts by weight ZnO, about 13 parts by weight $SiO_2$ and about 10 parts by weight CuO.

5. A sealing glass composition according to claim 1 and consisting essentially of about 20 parts by weight PbO, about 20 parts by weight $B_2O_3$, about 40 parts by weight ZnO, about 10 parts by weight $SiO_2$, and about 10 parts by weight CuO.

6. A sealing glass composition according to claim 1 and consisting essentially of about 14 parts by weight PbO, about 20 parts by weight $B_2O_3$, about 40 parts by weight ZnO, about 10 parts by weight $SiO_2$, and about 10 parts by weight CuO.

References Cited in the file of this patent

UNITED STATES PATENTS

| 2,889,952 | Claypoole | June 9, 1959 |
| 2,931,142 | Veres | Apr. 5, 1960 |

| Example | IV | V | VI | VII | VIII | IX | X | XI | XII | XIII | XIV | XV | XVI |
|---|---|---|---|---|---|---|---|---|---|---|---|---|---|
| PbO | 29 | 23 | 23 | 20 | 17 | 20 | 14 | 14 | 14 | 11 | 11 | 11 | 11 |
| $B_2O_3$ | 20 | 20 | 20 | 23 | 26 | 20 | 29 | 26 | 26 | 32 | 26 | 26 | 20 |
| ZnO | 34 | 40 | 35 | 40 | 40 | 43 | 40 | 43 | 40 | 40 | 46 | 40 | 40 |
| $SiO_2$ | 7 | 7 | 7 | 7 | 7 | 7 | 7 | 7 | 7 | 7 | 7 | 7 | 13 |
| CuO | 10 | 10 | 10 | 10 | 10 | 10 | 10 | 10 | 13 | 10 | 10 | 16 | 16 |
| CdO |  |  | 5 |  |  |  |  |  |  |  |  |  |  |
| Annealing point | 429 | 442 |  | 460 | 472 |  | 482 | 474 | 468 | 490 | 480 | 465 |  |

FOREIGN PATENTS 634,548    Great Britain    Mar. 22, 1950